Patented July 23, 1935

2,009,287

UNITED STATES PATENT OFFICE 2,009,287

MACHINE FOR OPERATING ON NEEDLES

James Baxter, Glasgow, and William Tivendale, Clydebank, Scotland, assignors to The Singer Manufacturing Company, Elizabeth, N. J., a corporation of New Jersey Application July 6, 1933, Serial No. 679,163
In Great Britain July 8, 1932

19 Claims. (Cl. 163—4)

This invention relates to improvements in the manufacture of needles and has for an object to provide a machine adapted to automatically present needle-blanks to a suitable tool or tools actuated to perform needle-making operations upon the needle-blanks.

Another object of the invention is to provide a machine for operating upon needle-blanks, which machine is adapted to automatically transfer partially formed needle-blanks from a hopper or other needle-blank supply to a needle-blank carrier and to present the partially formed needle-blanks, disposed in a predetermined position angularly of the longitudinal axis thereof, to a suitable tool or tools designed and actuated to perform needle-making operations upon the needle-blanks.

More specifically, the present invention has for an object to provide a machine adapted to automatically supply partially grooved needle-blanks having projecting fins to a rotatable turret and to automatically present said needle-blanks in predetermined position to a plurality of tools including groove-milling means and fin-milling means.

With the above and other more specific objects in view, the invention comprises the devices, combinations and arrangements of parts hereinafter described in connection with the accompanying drawings which illustrate a preferred embodiment of the invention, from which the several features of the invention and the advantages attained thereby will be readily understood by those skilled in the art.

In the accompanying drawings, Fig. 1, 1ª and 1ᵇ together constitute a plan view showing the general layout of the turret and tool-heads, Fig. 1 showing the central portion of the machine and Figs. 1ª and 1ᵇ showing the portions to the left hand and to the right hand, respectively, of Fig. 1.

Referring to the drawings, 1 denotes a turret which is rotatable stepwise in the direction indicated by the arrow A (Fig. 1) in a horizontal plane and around which are grouped a feeding station indicated generally at 2 for feeding needle blanks to the turret 1, a fin-locating head indicated generally at 3, a groove-detecting and locating head situated at 4 (Fig. 1) and shown in detail in Figs. 7–12, a groove-milling head indicated generally at 5, a groove-locating head indicated generally at 6 and a fin-milling head indicated generally at 7.

The turret 1 presents around its periphery a plurality of radial pockets 8 adapted to receive the shanks of needle-blanks 9 ejected endwise, shank end first, from the feeding station 2, the pockets 8 being so dimensioned that the blades of the needle-blanks project outwardly from the turret 1. Mounted on the turret 1 immediately above each pocket 8 is a blade spring 10 forming a detent engageable with the shank of the needle-blank fed into the associated pocket 8.

In operation, in each step of rotation of the turret 1 a pocket 8 is brought into register with the feeding station 2 and needle-blanks on the turret are brought into register one with each of the tool-heads 3—7, blanks being fed one at a time into the pockets 8 as said pockets 8 register successively with the feeding station 2.

As each needle-blank on the turret 1 comes into register with the fin-locating head 3, the finned portion of the needle-blank is embraced by two diametrally opposed spring-urged fingers 11 which are carried by a chuck 12 of the fin-locating head 3, and which, when the chuck 12 performs a partial rotation, engage the fins 13 and rotate the needle-blank until the fins 13 are located in the same vertical plane. The chuck 12 is mounted for axial movement radially of the turret 1 and for rotation about an axis coincident with the axis of the needle-blank on a spindle 14 disposed radially of the turret 1 and adapted to be axially advanced to bring the fingers 11 into operative relation with the fins 13 and to be axially retracted after each fin-locating operation.

As each needle-blank on the turret 1 comes into register with the groove-detecting and locating head (Figs. 7–12), two diametrally opposed spring-urged fingers 15, 16 advance into engagement with opposite sides of the needle blade, and, if the needle-blank is so angularly disposed that the recess 17 (Figs. 17 and 18) in one side of the needle blade, immediately above the needle eye 18, is entered by the finger 16, excess movement of the finger 16 towards the needle blade causes the fingers 15, 16 to rotate the needle-blank through 180° into correct angular position for presentation to the groove-milling head 5, followed by retraction of the fingers 15, 16 clear of the needle-blank. If, on advance of the fingers 15, 16, the needle blade happens to be disposed in correct angular position for presentation to the groove-milling head 5, i. e., when the side of the blade opposed to the recess 17 and presenting a partially formed groove 19 (Figs. 18 and 19) is engaged by the finger 16, the fingers 15, 16 are retracted clear of the needle-blank without effecting rotation thereof.

Figures 16, 17, 18, 19, 20, 21:
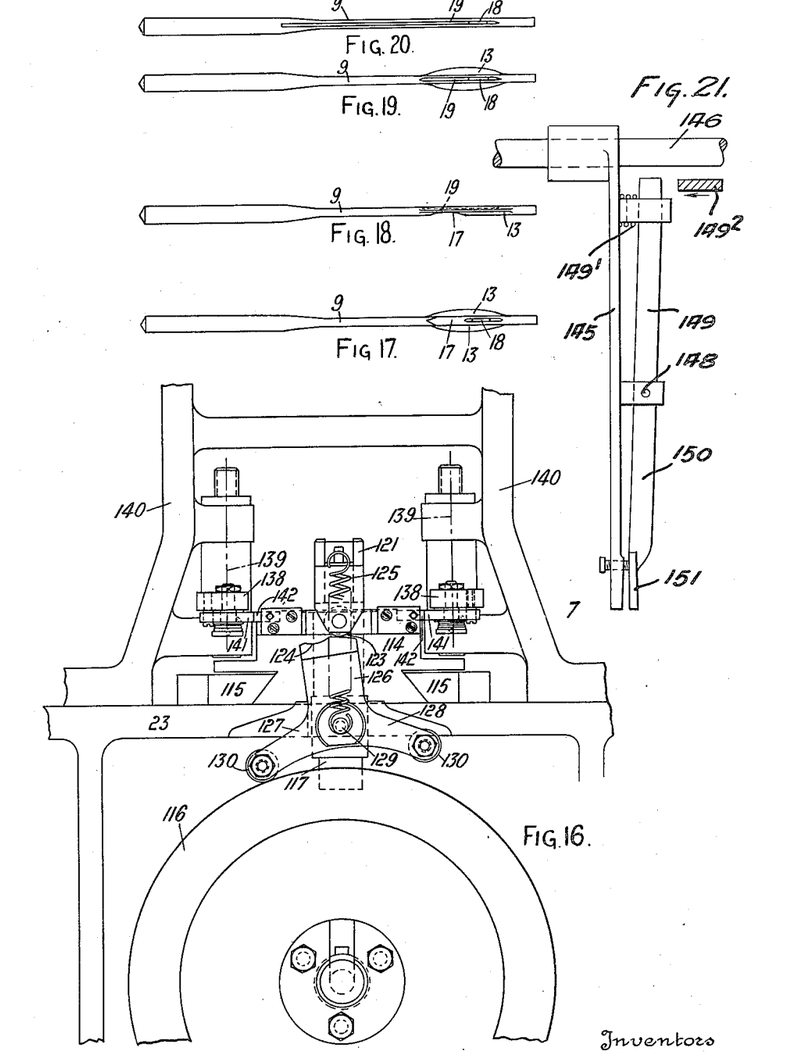
Figs. 17–20 are detail views of a needle-blank, Fig. 17 being an elevation, Fig. 18 a view at right angles to Fig. 17, Fig. 19 a view at 180° to Fig. 17, and Fig. 20 a view corresponding to Fig. 19 showing the blank after the groove-milling and fin-milling operations thereon have been completed.
Figure 21 is a fragmentary detail view.

As each needle-blank carried by the turret 1 comes into register with the groove-milling head 5, the needle-blank is extracted from its pocket 8 in the turret 1 by means hereinafter described, operated on in the groove-milling head 5 to extend the groove 19 along the blade, as shown in Fig. 20, and replaced in its pocket 8.

As each needle-blank comes into register with the groove-locating head 6 it is acted upon thereby to rotate the needle-blank through 90° in order to bring the fins 13 into the same horizontal plane for presentation to the fin-milling head 7.

As each needle-blank comes into register with the fin-milling head 7, it is extracted from its pocket 8 in the turret 1, acted upon within the fin-milling head 7 to remove the fins as shown in Fig. 20, and finally ejected from the fin-milling head 7.

The turret 1 is secured on a vertical shaft 21 journalled and axially located in a bearing 22 (Fig. 2) mounted centrally in a table 23 upon which are positioned the feeding station 2 and the tool-heads 3—7. Journalled on the shaft 21 below the table 23 is a worm-wheel 24 continuously rotated in the direction of the arrow A (Fig. 1) by means of a worm 25 (Fig. 1) meshing therewith and secured on a driving shaft 26. Frictionally acting on the underface of the worm-wheel 24 is an annular friction member 27 coupled to the shaft 21 and adapted frictionally to transmit stepwise rotation to the shaft 21 from the continuously rotating worm-wheel 24. Coupled also to the shaft 21 by means of a pin 28 is a toothed wheel 29 presenting on its periphery two sets of teeth, namely, an upper set 30 and a lower set 31, one set of teeth being pitched intermediate the other set of teeth. Engageable alternately with the teeth 30, 31 so as intermittently to arrest rotation of the turret 1 is a detent 32 unitary with one arm 33 of a three-armed lever 33, 34, 35 pivoted at 36 to a bracket 37 secured to the underside of the table 23. Mounted on the other arms 34, 35 of the lever 33—35, one on each arm, are two cam-followers 38, 39 cooperating with a rotary face-cam 40 unitary with a gear wheel 41 meshing with a driving gear pinion 42 secured on a main driving shaft 43. Compression springs 44 housed in recesses 45 in the boss of the toothed wheel 29 act upwardly on the annular friction member 27 to maintain said member 27 in frictional engagement with the worm-wheel 24, the member 27 being coupled to the wheel 29 by means of pins 27' upstanding from the wheel 29 and engaging apertures in the member 27.

The arrangement is such that in the rotation of the face cam 40 the detent 32 is moved into alternating engagement with the teeth 30, 31 so as intermittently to arrest the drive to the turret 1, it being understood that, while rotation of the turret 1 is arrested, the worm-wheel 24 is rotating against the frictional restraint of the friction member 27. A collar 46 secured on the lower end of the shaft 21 presents two spaced projecting lugs 47 which straddle the lower end of the pin 28 and through which are screw-threaded two set-pins 48 between the inner ends of which is clamped the pin 28. As will be evident, by adjusting the set-pins 48 the angular setting of the toothed wheel 29 with respect to the turret 1 may be accurately determined.

Located at the blank feeding station 2 is a V-shaped hopper 50 into which needle-blanks are fed with their shanks disposed towards the turret 1 and in the base of which is mounted with its axis extending radially of the turret 1 a stepwise rotatable feed roller 51 overhanging the periphery of the turret 1 and presenting on its periphery longitudinal grooves 52 adapted to entrain blanks from the hopper 50 and to carry said blanks to the underside of the roller whence the blanks are dropped one into each pocket 8 of the turret 1 as the pockets 8 come into register successively with the feeding station. As each blank drops from a groove 52, its shank enters the pocket 8 therebelow and its blade engages a fixed rest 53. Mounted for reciprocating movement radially of the turret 1, in line with the blank ejected from the roller 51, is a cam-actuated reciprocatory pusher bar 54 which, as each blank is ejected from the roller 51, is reciprocated to propel the blank endwise so that the shank of the blank is pushed forcibly below the detent spring 10 of the respective pocket 8. The roller 51 is carried by a spindle 55 which carries on its outer end a ratchet pinion 56 with which cooperate a detent 57 and a pawl 58 deriving motion from a vertically reciprocating cam-actuated tappet 59.

In lieu of charging needle-blanks into the hopper 50 the blanks may be charged galley-fashion into a guideway 60 along which they are laterally displaced towards the feed roller 51 under the action of a gravity-actuated pusher 61.

Figure 1:
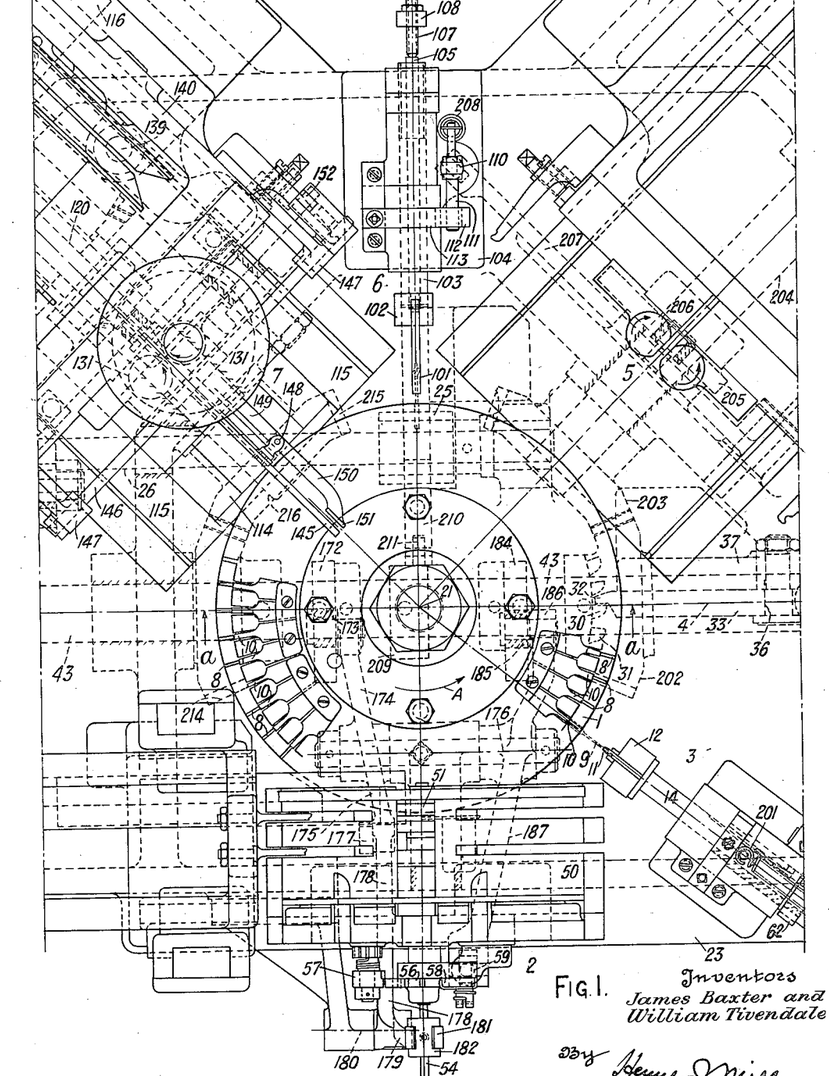
Figure 1A:
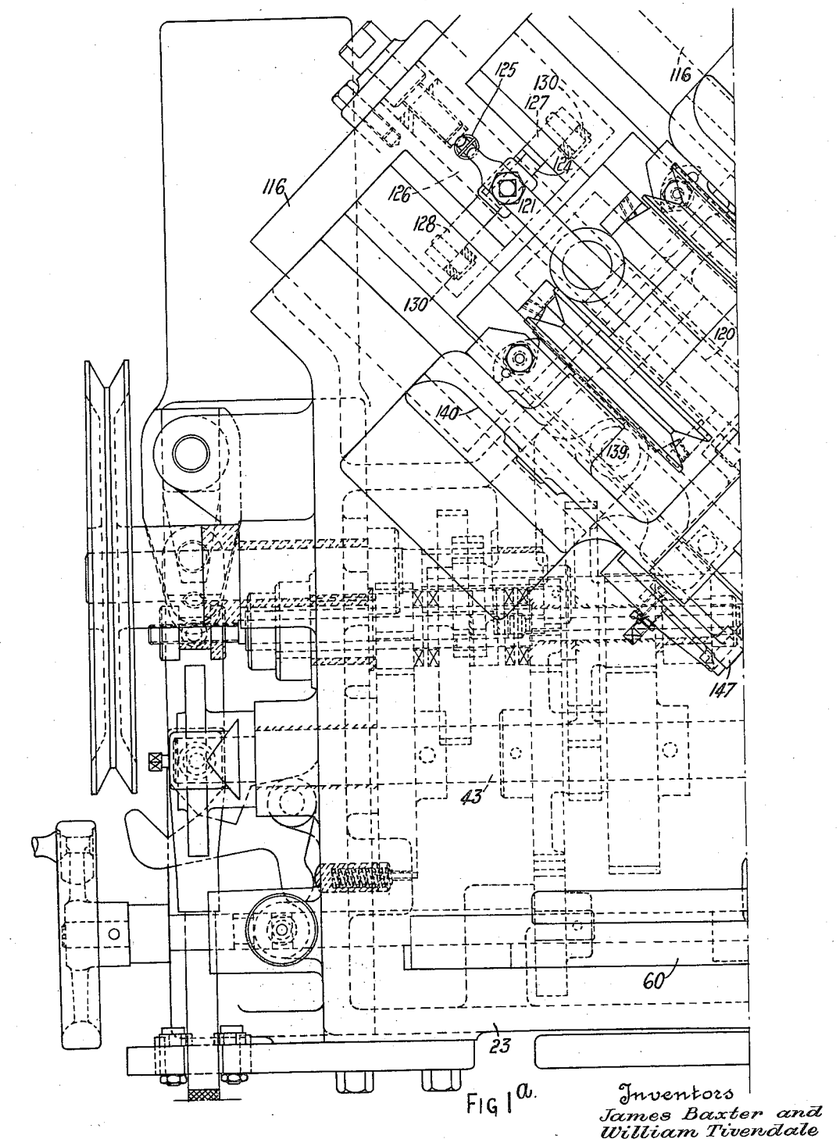
Figure 1B:
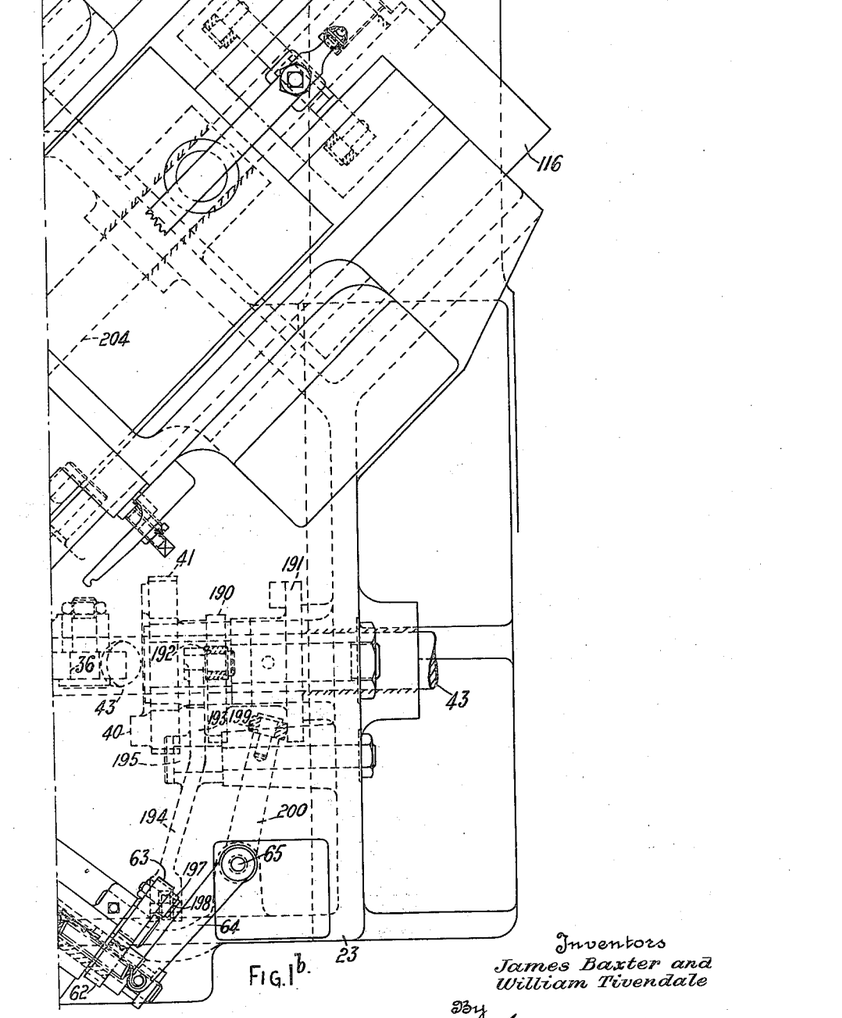
Figure 4:
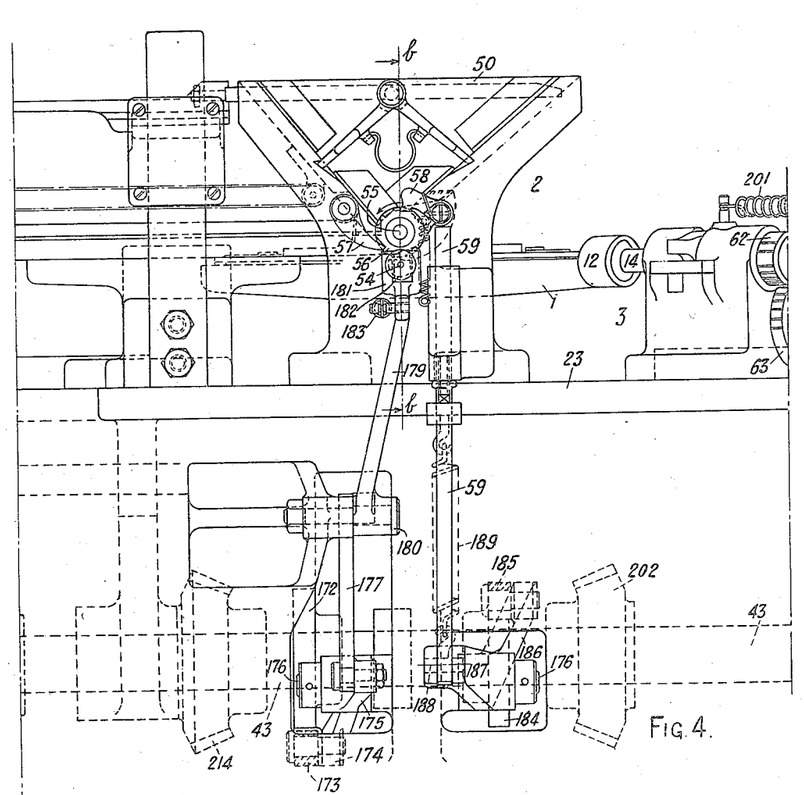
Figs. 4, 4ª and 4ᵇ together constitute a side elevation showing the needle-blank feeding station and the fin-locating head, Fig. 4 showing the central portion of the machine and Figs. 4ª and 4ᵇ showing the portions to the left hand and to the right hand, respectively, of Fig. 4.
Figure 4A:
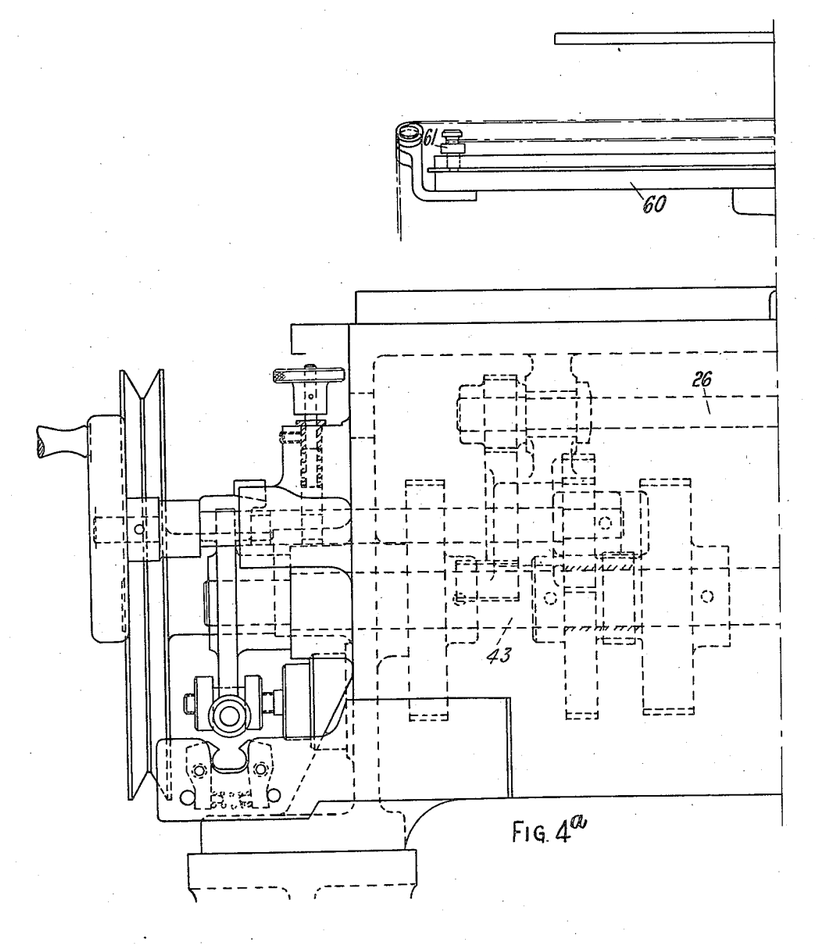
Figure 5:
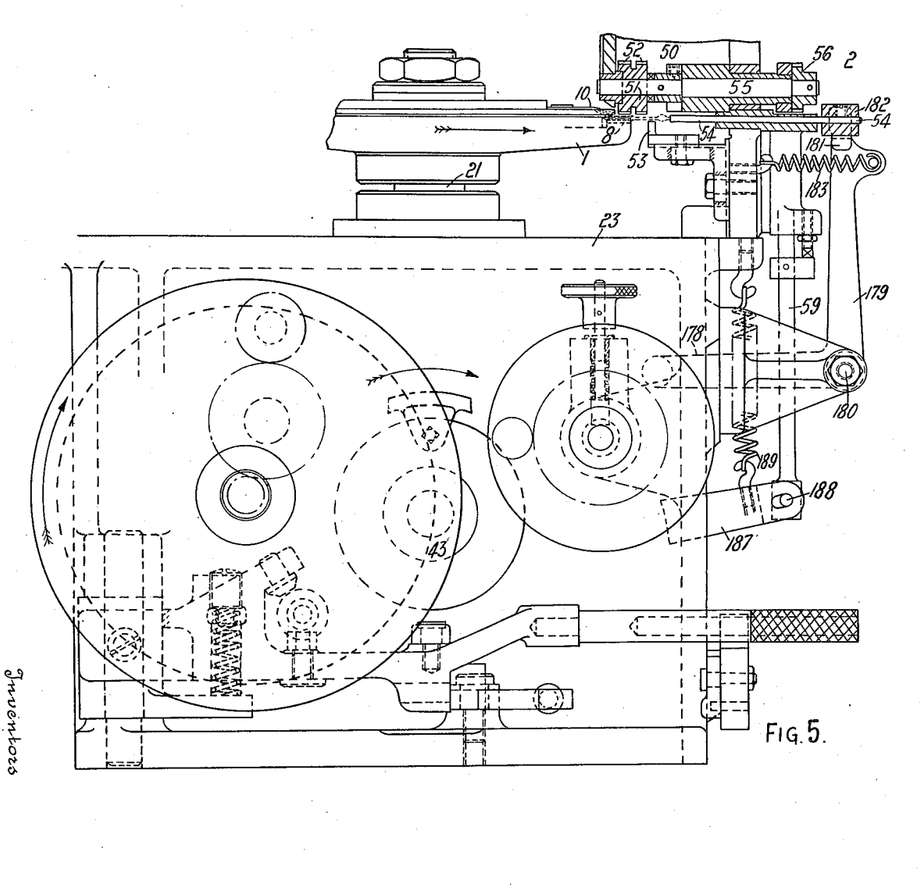
Fig. 5 is a part elevation part vertical section on the line b—b of Fig. 4.

The spindle 14 of the fin-locating head 3 (Figs. 1b, 4b and 6) receives its partial rotative movements through the medium of intermeshing cam-actuated gear pinions 62, 63, and receives its axial movements through means including an arm 64 secured on the upper end of a cam-oscillated vertical spindle 65.

The fingers 15, 16 of the groove-detecting and locating head (Figs. 7–12) are pivoted at 66, 67, respectively, to a chuck 68 and are relatively closed or opened for engagement with or disengagement from the needle-blank by means of a sliding collar 69 actuated by a cam 70 secured on the front end of a shaft 71 journalled and axially located in a casting 72 which carries the chuck 68 and its actuating spindle 73 and which is slidable radially of the turret 1 between guides 74 secured on the table 23. The shafts 71, 73 are driven by and are axially slidable through gear pinions 75, 76, respectively, of which the pinion 75 meshes with an idler 77 which meshes in turn with a driving pinion 78 on the shaft 43. The pinion 76 meshes with a pinion 80 in mesh with a vertically slidable gravity-loaded rack 81 with which co-operates one arm of a two-armed lever 82 the other arm of which carries a follower 83 co-operative with a cam 84 secured on the pinion 75. Sliding movements radially of the turret 1 are imparted to the casting 72 by a grooved cam 85 secured on the shaft 71 and engaging a normally fixed roller 86 carried by a lever 87 adjustably pivoted to a bracket 88 secured to the table 23 and carrying the gear pinions 75, 76, 77 and 80. Unitary with the finger 16 on the opposite side of the pivot 67 is a toe 89 engageable with the arm 90 of a spring-urged bell-crank 90, 91 pivoted at 92 to the casting 72. The other arm 91 of the bell-crank carries a contact 93 engageable with a fixed contact 94 to close an electric circuit including an electro-magnet 95 controlling a spring-urged pivoted armature 96 forming a trigger adapted normally i. e., when the electro-magnet 95 is not excited, to sustain the rack 81 in raised position against the action of gravity.

In operation, the casting 72 is slid radially of the turret 1 to bring the fingers 15, 16 into and out of operative relation with the needle-blank by the cam 85. Should the spring-urged finger 16 enter the recess 17 of the needle-blank, the toe 89 of said finger engages the arm 90 of the bell-crank 90, 91, whereby the bell-crank lever is rocked and the contacts 93, 94 are closed to excite the electro-magnet 95. The electro-magnet 95 thereupon disengages the trigger 96 from supporting relation with the rack 81 which is allowed to fall to a limited extent and in so doing imparts 180° rotation to the shaft 73 to correct the angular position of the needle-blank as hereinbefore explained. In the retractive stroke of the casting 72 the rack 81 is restored to raised position by the cam 84 acting on the rack through the medium of the lever 82. The rotation of the shaft 73 is limited to 180° in each direction by a collar 97 secured to the shaft 73 and presenting an arm 98 cooperative with a diametrally opposed pair of adjustable stops 99.

The groove-milling head 5 is substantially similar to the fin-milling head 7 which latter is hereinafter described in detail with reference to Figs. 14, 15 and 16.

The groove-locating head 6 (Figs. 1 and 13) comprises cooperative spring-urged fingers 100, 101 engageable with the needle-blank and pivoted to a chuck 102 carried on the inner end of a tubular shaft 103 extending radially of the turret 1 and journalled in a bracket 104 fixed to the table 23. Axially movable within the shaft 103 is a rod 105 endwise shift of which is adapted to control the fingers 100, 101 so as to cause said fingers to engage or to release the needle-blank. The inner end of the rod 105 engages shoulders 106 on the inner ends of the fingers 100, 101 and the outer end of the rod 105 is engageable by a tappet 107 on the upper end of a spring-influenced lever 108 fulcrumed between its ends at 109 and cam-actuated to control the opening and closing movements of the fingers 100, 101. For effecting 90° rotation of the shaft 103 there is provided a vertically movable spring-influenced cam-actuated plunger 110 carrying on its upper end a transverse striker 111 engageable to rotate the shaft 103 through 90° with an arm 112 on a collar 113 secured on the shaft 103.

The finger 100 is bifurcated so as partially to embrace the blade of the needle-blank while the finger 101 is adapted to enter the groove 19 in the blade so as positively to entrain the needle-blank for rotation through 90° to bring the fins 13 into the same horizontal plane for presentation to the fin-milling head 7.

The fin-milling head 7 (Figs. 1, 1a, 14–16) comprises a slide 114 movable radially of the turret 1 between fixed guides 115 and actuated by a rotatable grooved cam cylinder 116 engaged by a follower 117 mounted on the underside of the slide 114. Carried by the slide 114 is a needle-blank clamp comprising a lower clamp element 118 fixed to the front end of the slide 114 and a cooperative movable upper clamp element 119 carried by the front arm 120 of a two-armed lever 120, 121 fulcrumed between its ends at 122 on the slide 114 and carrying on its rear arm 121 a follower 123 adapted to be tracked by a rock cam 124 which controls the movement of the clamp element 119. A tension spring 125 maintains the follower 123 in engagement with the cam 124. The cam 124 is formed on the upper end face of the arm 126 of a three-armed lever 126, 127, 128 pivoted at 129 to the slide 114. Each of the lever arms 127, 128 is provided with a follower 130 each engageable by a cam presented by the cam cylinder 116. In operation, the slide 114 advances into the position shown in Fig. 14, so that the clamp elements 118, 119 embrace the blade of the needle-blank projecting from the turret 1, it being understood that the fins 13 of the needle-blank lie in the same horizontal plane and project laterally between the clamp elements. The cam 124 acts through the lever 120, 121 to depress the clamp element 119 upon the blade of the blank so that the blank is securely held between the clamp elements. The slide 114 recedes, carrying with it the needle-blank, and, as the blank approaches centrally between a cooperative pair of milling cutters 131 rotating in a horizontal plane containing the blank, said cutters are moved towards one another, one on each side of the needle blade, into cutting relation with the fins 13, which are thus milled from the blank. The cutters 131 then move apart clear of the blank and the slide commences to advance, during which advance movement the clamp element 119 rises to release the blank. The cutters 131 are carried by vertical spindles 132, 133 journalled in brackets 134, 135 slidable horizontally transversely of the needle-blank to bring the cutters into and out of cutting relation with the needle-blank. Each bracket 134 or 135 is provided with a roller 136 engageable with one arm 137 of a two-armed lever 137, 138 pivoted between its ends at 139 on a bracket 140 secured to the table 23 one on each side of the slide 114 and carrying the cutter slide brackets 134, 135. The other arm 138 of each lever 137, 138 carries a follower 141 adapted, in the travel of the slide 114, to be engaged by a cam 142 carried by the slide 114 and serving to impart relative horizontal sliding movements to the brackets 134 and 135. Tension springs 143 acting on the brackets 134, 135 in the direction to separate the cutters 131 serve to maintain the rollers 136 in cooperative engagement with the lever arms 137. The cam 116 is so formed that the retraction of the needle-blank from its pocket in the turret is performed rapidly, whereas the travel of the blank during the actual milling operation is performed comparatively slowly. Before the clamp element 119 rises to release the blank, the shank of the blank is engaged by spring-contracted tweezers which deliver the blank into a receptacle or chute and which include an arm 145 carried by a rock shaft 146 journalled in brackets 147 attached to the brackets 140 above the level of the cutters 131. Pivoted at 148 to the arm 145 is a two-armed lever 149, 150 of which the arm 149 is urged by a spring 149' and the arm 150 presents a clamp element 151 cooperative with the free end of the arm 145 to grip the shank of the needle-blank under the action of the spring 149'. In operation, immediately after the fin-milling operation and in the advance of the slide 114, the rock shaft 146 is actuated through the medium of a cam-actuated link 152 to swing the tweezers downwardly from the position 153 to the position 154 (Fig. 14) in which latter position the clamp elements 145, 151 engage the needle shank. The clamp element 119 then rises to release the blank, whereupon the tweezers are swung upwardly to initial position and by engagement of the arm 149 of the two-armed lever 149, 150 by a stop 149² movable with the cutter-carrying bracket 135 the clamp element 151 is moved away from the needle blank which is allowed to drop into a suitably placed receptacle or into a chute directed into such receptacle.

As hereinbefore mentioned, the groove-milling head 5 is substantially similar to the fin-milling head 7, it being understood that in the groove-milling head one milling cutter only is necessary to effect the grooving operation described. Two milling cutters may, however, be used in the groove-milling head 5 when the needle-blanks are to be formed with two diametrally opposed grooves. Blank-ejecting tweezers are not required in the groove-milling head, it being understood that the blank is returned to the turret after the groove-milling operation.

The feed station and the tool-heads with the exception of the milling cutters are driven from the shaft 43 which is journalled beneath the table 23.

The blank feed pusher bar 54 is actuated from a cam 172 secured on the shaft 43 and engaged by a follower 173 carried on one arm 174 of a double-armed lever 174, 175 pivoted at 176. The other arm 175 of said lever is connected by means of a link 177 to one arm 178 of a bell-crank 178, 179 pivoted at 180. The other arm 179 of the bell-crank is bifurcated at 181 so as operatively to engage a collar 182 secured to the outer end of the pusher bar 54. A tension spring 183 acting on the bell-crank arm 179 is adapted to propel the pusher bar 54 under the control of the cam 172. The tappet 59 for actuating the blank feed roller 51 is actuated from a cam 184 secured on the shaft 43 and engaged by a follower 185 on one arm 186 of a two-armed lever 186, 187 pivoted at 176. The other arm 187 of said lever has a pin-and-slot connection 188 with the lower end of the tappet 59 and is urged by a tension spring 189 in the direction of the upward or operative stroke of the tappet 59.

For actuating the fin-locating head 3 there are provided on the shaft 43 two cams 190 and 191. The cam 190 is engaged by a follower 192 on one arm 193 of a two-armed lever 193, 194 pivoted at 195. The other arm 194 of said lever is pivotally connected at 196 to the lower end of a link 197 the upper end of which is connected to a crank pin 198 on the gear pinion 63 of the fin-locating head. The cam 191 is engaged by a follower 199 on an arm 200 secured on the lower end of the spindle 65 of the fin-locating head, which spindle 65 is oscillated by the cam 191 to impart axial movements to the head spindle 14 through the medium of the arm 64. A tension spring 201 acts on the arm 64 in the direction to advance the spindle 14 towards the turret 1.

Secured on the shaft 43 is a bevel pinion 202 meshing with a bevel pinion 203 secured on a shaft 204 which carries and drives the cam cylinder 116 on the groove-milling head 5. Secured on the shaft 204 is a cam 205 engaged by a follower 206 on a lever 207 which actuates the plunger 110 of the groove-locating head 6. A tension spring 208 acts downwardly on the plunger 110. Provided also on the shaft 43 is a cam 209 which actuates the tappet 107 of the groove-locating head 6 through the medium of a link 210 provided at one end with a follower 211 cooperating with the cam 209 and operatively connected at 212 at its other end to the lower end of the lever 108 which carries the tappet 107, the lever 108 being influenced by a spring 213 which maintains the follower 211 in engagement with the cam 209.

Secured on the shaft 43 is a bevel pinion 214 meshing with a bevel pinion 215 on a shaft 216 which carries and drives the cam 116 of the fin-milling head 7.

From the foregoing description, it will be understood that partially formed needle-blanks 9, having projecting fins as illustrated in Figs. 17, 18 and 19 of the drawings, are successively supplied to the step-wise rotating turret 1 from the hopper 50 or, if preferred, from the guideway 60. Each of the needle-blanks is deposited with its shank in a turret-pocket 8, in front of a detent spring 10, and with its blade supported by the rest 53. The pusher-bar 54 is now advanced under the influence of the spring 183 (Fig. 5) to force the shank of the blank under the detent spring 10, which thereupon serves to support the blank upon the turret.

Figures 2, 4B:
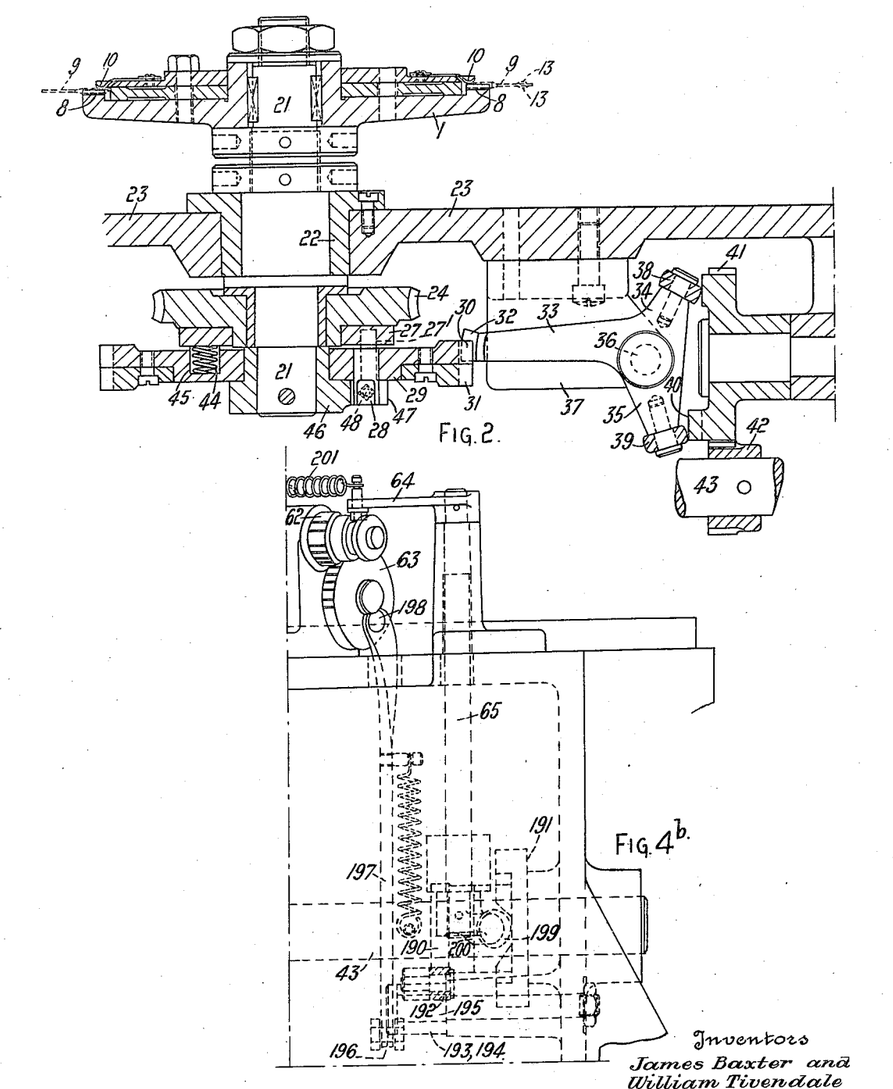
Fig. 2 is a vertical section on the line a—a of Fig. 1 showing the turret and the mechanism for imparting stepwise rotation thereto.
Figure 3:
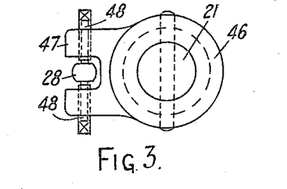
Fig. 3 is a fragmentary inverted plan of Fig. 2.
Figures 6, 7:
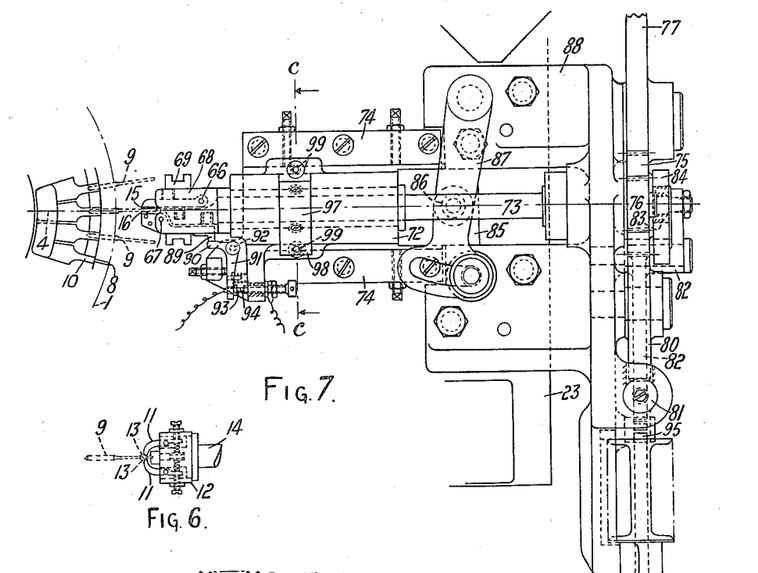
Fig. 6 is a fragmentary detail view of the chuck of the fin-locating head.
Figs. 7–12 are detail views of the groove-detecting and locating head, Fig. 7 being a plan, Fig. 8 a side elevation partly in section, Fig. 9 a front end elevation, Figs. 10 and 11 elevations at right angles to one another showing the driving mechanism for the head, and Fig. 12 a transverse section on the line c—c of Fig. 7.
Figures 8, 9:
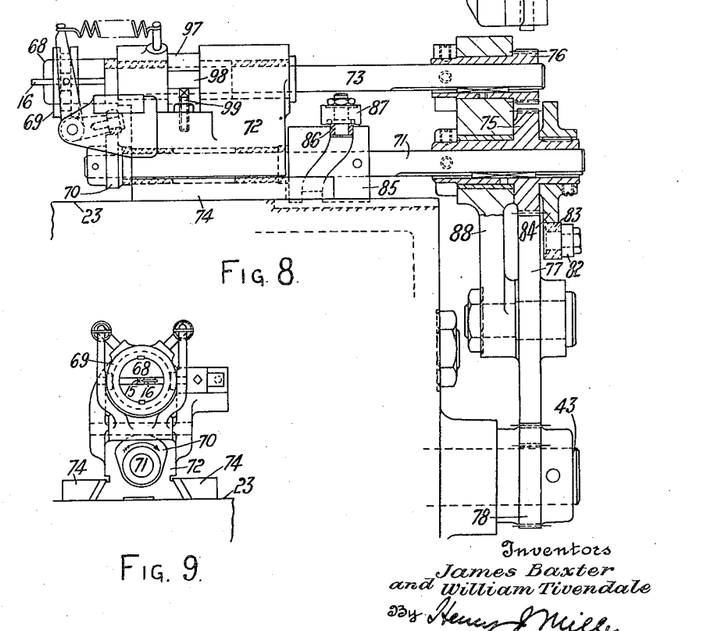
Figures 10, 11, 12:
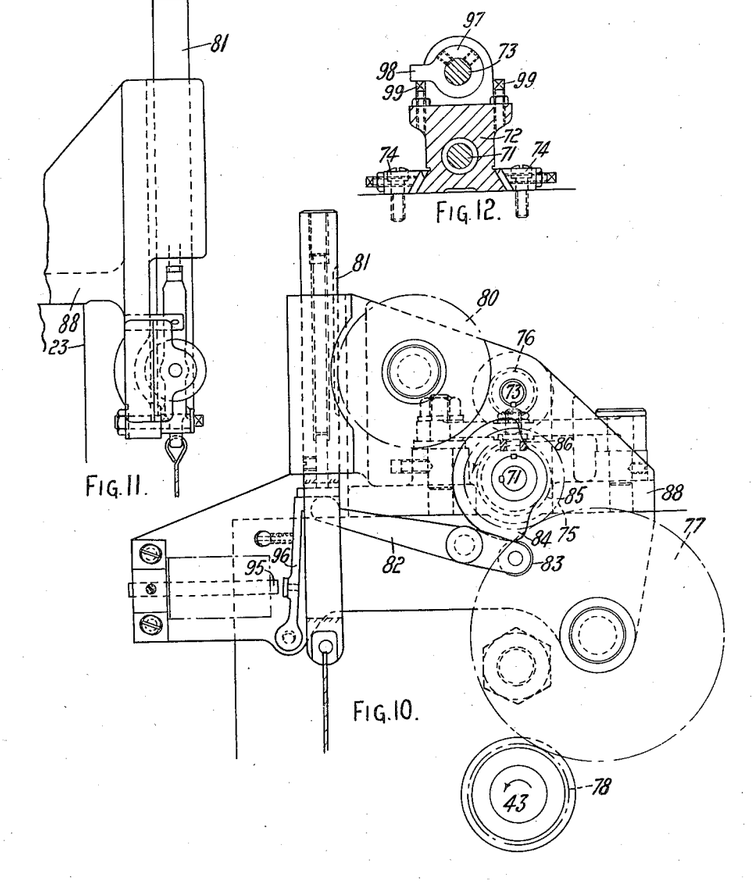

The turret 1 is then step-wise advanced by the mechanism illustrated more particularly in Figs. 1 and 2, to carry the needle-blank to the fin-locating station 3, where the fins of the needle-blank are engaged by the spring-pressed fingers 11 of the chuck 12, Fig. 7, which chuck functions to rotate the needle-blank axially upon the turret to position the needle-blank fins in a vertical plane. To this end and as shown in Figs. 1, 1ᵇ, 4 and 4ᵇ, the chuck-carrying shaft 14 is initially advanced yieldingly toward the turret 1 by the spring 201 and is then partly rotated from the cam 190, which acts through the lever 193, 194, link 197, and gear pinion 63 to rotate the gear pinion 62 keyed upon the chuck-shaft 14. Should the needle-blank be correctly positioned when presented to the chuck 12, the latter merely operates idly.

While the needle-blank has now been positioned with the fins vertically disposed, it is still necessary to insure that the partially formed groove 19 is definitely positioned. To that end, the turret 1 now advances the needle-blank to the groove-detecting and -locating head 4, where the fingers 15 and 16 are advanced into engagement with opposite sides of the needle-blade. As herein previously described in detail, the needle-blank is turned 180° by the fingers 15 and 16 if the blank is so positioned that the blank-recess 17 is entered by the finger 16.

The turret now carries the correctly positioned needle-blank to the groove-milling station 5, at which point the needle-blank is abstracted from the turret-pocket 8 and is operated upon to extend the groove 19 along the blade, after which the blank is returned to the turret-pocket. The groove-milling mechanism corresponds substantially with the fin-milling mechanism at station 7, but as the needle-blank is returned by the needle-clamp of the groove-milling head to the turret 1, the needle-blank removing tweezers are omitted at the groove-milling station. Further, the slide-actuating cam cylinder 116 of the groove-milling head 5 is provided with a cam groove which is so shaped that the needle clamp of the head 5 is caused first to advance to engage a needle-blank, to return so as to extract the needle-blank from the turret and to cause the blank to be acted upon by the milling cutter of the head 5 whereby to extend the groove 19 in the needle-blank, to advance and replace the needle-blank in the turret, to return to permit the turret to rotate through one step, and again to advance to engage the succeeding needle-blank and so repeat its operative cycle.

Figure 13:
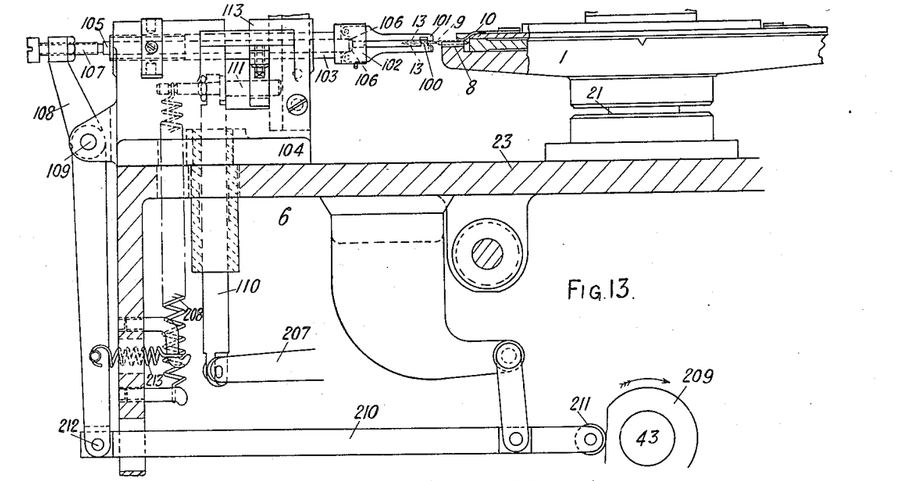
Fig. 13 is a part side elevation, part vertical section of the groove-locating head.

The needle-blank is returned to the turret 1 with the blank-fins 13 in a vertical plane, and the turret now carries the blank to the groove-locating station 6 shown in Figs. 1 and 13. At this station, the spring-pressed fingers 100, 101, controlled by the endwise reciprocatory rod 105, engage the blank. The fingers 100, 101 are thereupon rotated 90° by the vertically movable plunger 110, as previously described, to position the blank-fins 13 in a horizontal plane.

Figure 14:
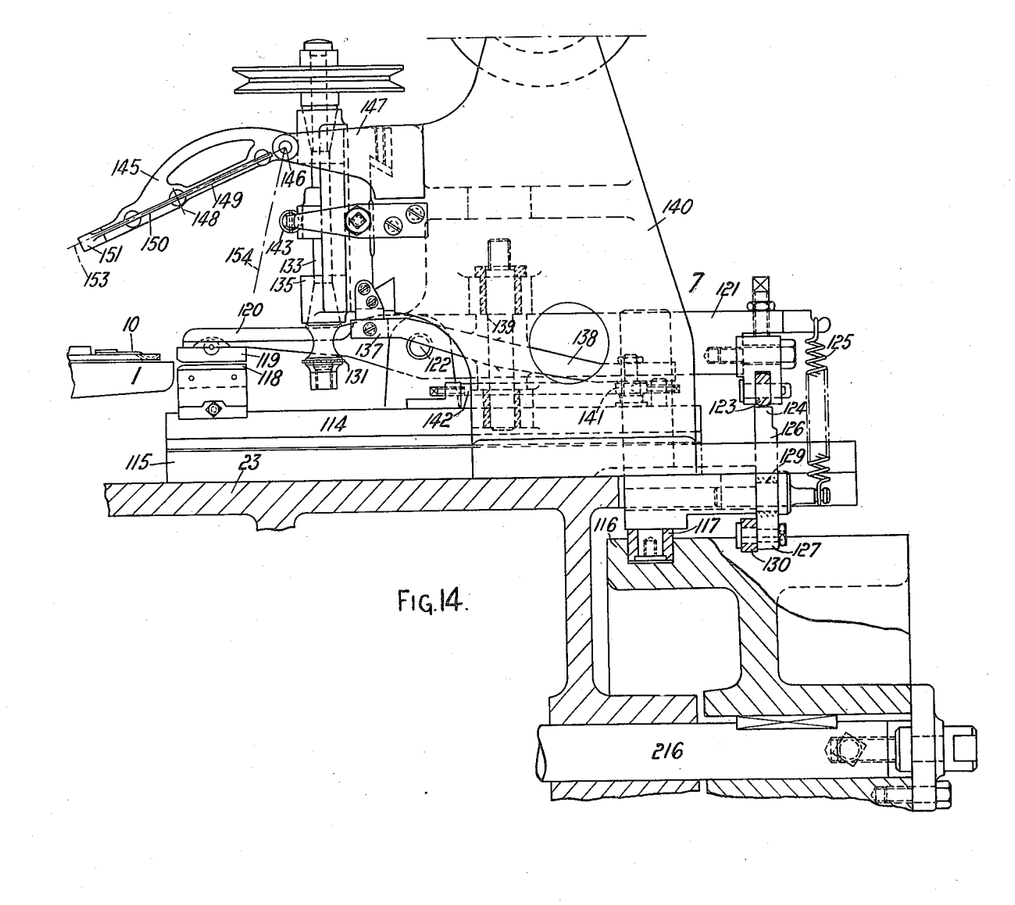
Figs. 14–16 show the fin-milling head, Fig. 14 being a side elevation, Fig. 15 a front elevation, and Fig. 16 a rear elevation.
Figure 15:
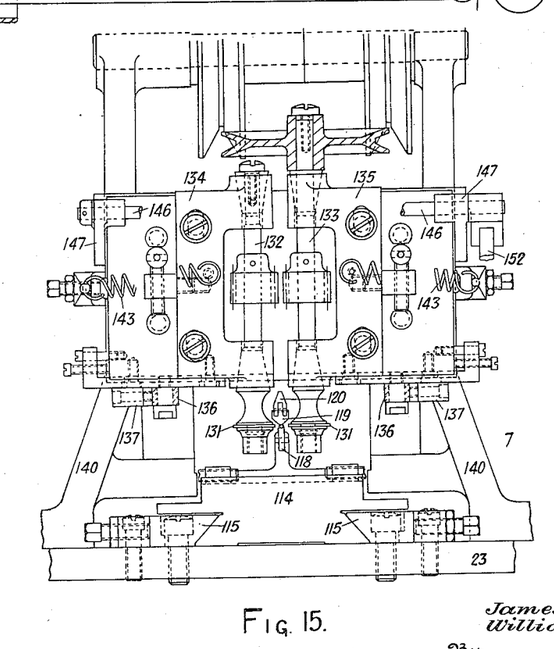

The turret 1 then advances to carry the needle-blank to the fin-milling station 7, Figs. 14, 15 and 16, whereupon the slide 114 is advanced by the cam 116 and the needle-blank is clamped between the clamp-elements 118, 119 by a rocking movement of the levers 120, 121 effected by the rock-cam 124. The slide 114 is now retracted to feed the needle-blank between the rotating milling cutters 131, which at the same time are moved towards one another into cutting relation with the needle-blank fins 13.

After the fin-milling operation, the slide 114 is again advanced toward the turret, and in a dwell during this movement of the slide the shank of the needle-blank is engaged by tweezers including the rock-arm 145 and the two-armed lever 149, 150, said tweezers being swung downwardly about the rock-shaft 146 by the cam-actuated link 152 to seize the needle-blank. The blank is simultaneously therewith released by the clamp-element 119, whereupon the tweezers are swung upwardly to initial position and are caused to release the needle-blank as hereinbefore explained, the blank dropping into a suitably placed receptacle or a chute.

We claim:—

1. A machine for grooving and for removing fins from needle-blanks, comprising a rotatable turret having peripheral pockets, a hopper above said turret, means for transferring needle-blanks successively from said hopper to said pockets with their blades projecting radially from said pockets, said transferring means including a stepwise rotatable roller formed on its periphery with longitudinal grooves and a pusher bar for ejecting the needle-blanks from said grooves into said pockets, means for imparting stepwise rotation to said turret, and a series of tool heads grouped around said turret, said tool heads comprising locating means, groove-milling means, and fin-milling means for operating successively on the needle-blanks.

2. A machine for grooving and for removing projecting fins from partially grooved needle-blanks, comprising a rotatable turret formed with peripheral pockets, means for imparting stepwise rotation to said turret, means for feeding partially grooved needle-blanks having projecting fins successively to said pockets and for positioning the needle-blanks in said pockets with the needle-blades projecting radially beyond said turret, and a series of tool heads grouped around said turret and arranged to act successively on the needle-blanks whereby, firstly, to position each needle-blank with respect to its fins, secondly, to reposition needle-blanks incorrectly disposed with respect to a partially formed groove in the needle-blade, thirdly, to extend said groove longitudinally of the needle-blade, fourthly, to correct the position of the needle-blank for the fin-removing operation, fifthly, to remove the fins, and, sixthly, to effect delivery of the needle-blank.

3. A machine for grooving and for removing projecting fins from partially grooved needle-blanks, comprising a rotatable turret formed with peripheral pockets, means for imparting stepwise rotation to said turret, a hopper above said turret, means for transferring needle-blanks having projecting fins successively from said hopper to said pockets and for positioning the needle-blanks in said pockets with the needle-blades projecting radially beyond said turret, and a series of tool heads grouped around said turret and arranged to act successively on the needle-blanks whereby, firstly, to position each needle-blank with respect to its fins, secondly, to reposition needle-blanks incorrectly disposed with respect to a partially formed groove in the needle-blade, thirdly, to extend said groove longitudinally of the needle-blade, fourthly, to correct the position of the grooved needle-blank for the fin-removing operation, fifthly, to remove the fins, and sixthly, to effect delivery of the needle-blank.

4. A machine for grooving and for removing fins from partially grooved needle-blanks, comprising a rotatable turret for carrying the needle-blanks, means for imparting stepwise rotation to said turret, and a series of tool heads grouped around the centre of rotation of said turret, said tool heads comprising fin-locating means, groove detecting means, means influenced by said groove detecting means for effecting a semi-rotation of an incorrectly positioned needle-blank, groove-milling means, and fin-milling means for operating successively on the needle-blanks.

5. A machine for grooving and for removing projecting fins from partially grooved needle-blanks, comprising a rotatable turret for carrying the needle-blanks, a continuously rotating member frictionally coupled to said turret, a toothed wheel rotatable with said turret, a cam-influenced detent serving intermittently to arrest rotation of said turret, and a series of tool heads grouped around the said turret, said tool heads comprising groove-milling means, fin-milling means for operating successively on the needle-blanks, and means for axially rotating said needle-blanks into definite position preparatory to operation upon said needle-blanks by said tool-heads.

6. A machine for grooving and for removing projecting fins from the blanks of partially formed needles, comprising a rotatable turret for carrying needle-blanks disposed upon the turret in angularly different positions of the needle-blank fins, means for imparting stepwise rotation to said turret, grove-milling means and fin-milling means stationed about said turret for operating on said needle-blanks, and locating means rendered effective by incorrectly positioned needle-blanks to impart to said needle-blanks axial rotation of an angular extent varying with different initial positions of the needle-blank, said locating means acting to bring the needle-blanks into definite position preparatory to the operation upon the needle-blanks by said groove-milling means.

7. A machine for grooving and for removing projecting fins from the blanks of partially formed needles, comprising a rotatable turret for carrying the needle-blanks, means for feeding the partially formed needle-blanks having projecting fins to said turret, means for imparting stepwise rotation of said turret, means effective to axially rotate incorrectly positioned needle-blanks into definite position, and a series of tool heads stationed about said turret including a groove-milling means and fin-milling means for operating successively upon said needle-blanks.

8. A machine for grooving and for removing projecting fins from partially grooved needle-blanks, comprising a rotatable turret for carrying the needle-blanks, means for imparting stepwise rotation to said turret, a series of tool heads stationed about said turret including groove-milling means and fin-milling means, and means rendered effective by incorrectly positioned needle-blanks to axially rotate said needle-blanks into definite position with respect to the partially formed grooves thereof preparatory to the operation upon the needle-blanks by said groove-milling means.

9. A machine for grooving and for removing projecting fins from partially grooved needle-blanks, comprising a rotatable turret for carrying the needle-blanks, means for imparting stepwise rotation to said turret, fin-locating means effective to axially rotate the needle-blanks into definite position with respect to the fins thereof, groove-locating means effective to axially rotate the needle-blanks incorrectly positioned with respect to the groove thereof by said fin-locating means, and a series of tool heads stationed about said turret including groove-milling means and fin-milling means.

10. A machine for grooving and for removing fins from partially grooved needle-blanks having projecting fins, including groove-milling and fin-milling tool-heads stationed to successively operate upon the needle-blanks, needle-blank feeding means for automatically advancing said needle-blanks to said tool-heads, and means for axially rotating said needle-blanks into definite position with respect to both the fins and the grooves thereof, preparatory to operation upon said needle-blanks by said tool-heads.

11. A machine for grooving and for removing projecting fins from partially grooved needle-blanks, comprising a rotatable turret for carrying the needle-blanks, means for imparting stepwise rotation to said turret, and a series of tool-heads grouped around said turret for operating successively on the needle-blanks, said tool heads comprising fin-locating means effective to axially rotate the needle-blanks into a definite position of the fins thereof, means effective to axially rotate the needle-blanks incorrectly positioned with respect to the grooves thereof, groove-milling means, fin-milling means, and means disposed between said groove-milling and fin-milling means for partly rotating the needle-blanks axially.

12. A machine for grooving and for removing projecting fins from partially grooved needle-blanks, comprising a rotatable turret having peripheral pockets, a hopper above said turret, means for transferring needle-blanks successively from said hopper to said pockets with their blades projecting radially from said pockets, means for imparting stepwise rotation to said turret, groove-milling means and fin-milling means stationed about said turret for operating on said needle-blanks, fin-locating means effective to axially rotate the needle-blanks into definite position with respect to the fins thereof, and groove-locating means effective to axially rotate the needle-blanks incorrectly positioned with respect to the groove thereof by said fin-locating means and preparatory to the operation upon the needle-blanks by said groove-milling means.

13. A machine for operating upon needle-blanks, including a rotatable turret for holding needle-blanks disposed lengthwise radially of the turret, a plurality of tool-head stations adjacent to and disposed circumferentially of said turret, mechanisms at said stations for progressively performing different needle-making operations upon said needle-blanks, means for imparting stepwise rotation to said turret to carry the needle-blanks to said tool-head stations, and means at each of said stations and reciprocable in directions radially of said turret for abstracting needle-blanks therefrom for presentation to said mechanisms.

14. A machine for operating upon needle-blanks, including a rotatable turret having needle-blank holding means, a tool-head station adjacent to said turret, mechanism at said station for performing a needle-making operation, means for imparting stepwise rotation to said turret to carry needle-blanks to said station, and means operative at said station for abstracting a needle-blank from said turret, feeding the abstracted needle-blank to said mechanism, and for returning the needle-blank to said turret.

15. A machine for operating upon needle-blanks, including a rotatable turret having needle-blank holding means, a plurality of tool-head stations disposed adjacent to said turret, mechanisms at each of said stations for performing needle-making operations, means for imparting stepwise rotation to said turret to carry needle-blanks to said stations, needle-blank feeding means operative at one of said tool-head stations for abstracting a needle-blank from said turret, presenting the abstracted needle-blank to the mechanism at that station, and for returning the needle-blank to the turret, and needle-blank feeding means disposed at a succeeding tool-head station for again abstracting the needle-blank from the turret and for presenting said needle-blank to the mechanism at that station.

16. A machine for operating upon needle-blanks, comprising a rotatable turret having needle-blank holding means, a hopper, means for transferring needle-blanks successively from said hopper to the needle-blank holding means of said turret, a plurality of tool-head stations adjacent to said turret, mechanisms at said stations for progressively performing different needle-making operations upon said needle-blanks, means for imparting stepwise rotation to said turret to carry the needle-blanks to said tool-head stations, and means at each of said stations for abstracting needle-blanks from said turret for presentation to said mechanisms.

17. A machine for operating upon needle-blanks including a rotatable turret having needle-blank holding means, a plurality of tool-head stations disposed adjacent to and spaced from each other circumferentially of said turret, means for imparting stepwise rotation to said turret to carry needle-blanks to said stations, different tools at said tool-head stations adapted to progressively perform needle-making operations upon said needle-blanks, reciprocatory slides at said tool-head stations provided with needle-clamps, and means for reciprocating said slides relatively to said turret to abstract the needle-blanks from the turret and present said needle-blanks to said tools.

18. A machine for operating upon needle-blanks, including a rotatable turret having needle-blank holding means, a plurality of tool-head stations disposed adjacent to and spaced from each other circumferentially of said turret, means for imparting stepwise rotation to said turret to carry needle-blanks to said stations, tools at said tool-head stations adapted to perform needle-making operations, reciprocatory slides at said tool-head stations provided with needle-clamps, means for reciprocating said slides relatively to said turret to abstract the needle-blanks from the turret and present said needle-blanks to said tools, and controlling means for the needle-clamp of one of said slides operating in timed relation to the reciprocatory movement of the slide to return the abstracted needle-blank to said turret.

19. A machine for operating upon needle-blanks, including a rotatable turret having needle-blank holding means, a hopper, means for transferring needle-blanks successively from said hopper to the needle-blank holding means of said turret, a plurality of tool-head stations disposed adjacent to and spaced from each other circumferentially of said turret, means for imparting stepwise rotation to said turret to carry needle-blanks to said stations, tools at said tool-head stations adapted to perform needle-making operations, needle-blank locating means effective in advance of said tool-head stations to insure a predetermined position of the needle-blanks angularly of the longitudinal axis of said blanks, means at the tool-head station to which the needle-blanks are initially advanced for successively abstracting a needle-blank from said turret, presenting said needle-blank to the tool at that station and for returning the needle-blank to said turret, means disposed between said tool-head stations for partially rotating the needle-blanks axially, and means effective at a succeeding tool-head station for abstracting a needle-blank from the turret and for presenting said needle-blank to the tool at said succeeding tool-head station.

JAMES BAXTER.
WILLIAM TIVENDALE.